US012722891B2

(12) United States Patent
Lerouge et al.

(10) Patent No.: US 12,722,891 B2
(45) Date of Patent: Sep. 1, 2026

(54) ORDER PREPARATION OR BUFFER STORAGE SYSTEM

(71) Applicant: EXOTEC, Croix (FR)

(72) Inventors: Alexis Lerouge, Hellemmes (FR); Loïc Lepillier, Wasquehal (FR)

(73) Assignee: EXOTEC, Croix (FR)

( * ) Notice: Subject to any disclaimer, the term of this patent is extended or adjusted under 35 U.S.C. 154(b) by 351 days.

(21) Appl. No.: 18/580,462

(22) PCT Filed: Jul. 20, 2022

(86) PCT No.: PCT/EP2022/070406

§ 371 (c)(1),
(2) Date: Jan. 18, 2024

(87) PCT Pub. No.: WO2023/001915

PCT Pub. Date: Jan. 26, 2023

(65) Prior Publication Data

US 2024/0336436 A1 Oct. 10, 2024

(30) Foreign Application Priority Data

Jul. 21, 2021 (FR) ....................................... 2107880

(51) Int. Cl.
*B65G 1/137* (2006.01)
*B61C 11/02* (2006.01)
*B61C 11/04* (2006.01)

(52) U.S. Cl.
CPC ............ *B65G 1/1373* (2013.01); *B61C 11/02* (2013.01); *B61C 11/04* (2013.01)

(58) Field of Classification Search
CPC ...... B65G 1/02; B65G 1/0485; B65G 1/0492; B65G 1/06; B65G 1/065; B65G 1/1371; B65G 1/1378; B65G 2207/04
See application file for complete search history.

(56) References Cited

U.S. PATENT DOCUMENTS 10,730,696 B2 * 8/2020 Moulin ................ B65G 1/1378
10,822,169 B2 11/2020 Moulin et al.
(Continued)

FOREIGN PATENT DOCUMENTS

CN 108726064 A 11/2018
WO 2010100513 A2 9/2010
(Continued)

OTHER PUBLICATIONS

International Search Report issued Oct. 17, 2022, in corresponding International Application No. PCT/EP2022/070406, 6 pages.

*Primary Examiner* — Joseph C Rodriguez
(74) *Attorney, Agent, or Firm* — Maier & Maier, PLLC

(57) ABSTRACT

An order preparation system including at least one automatically guided carriage which is intended to collect items of an order from shelves and is equipped with toothed wheels, which are mounted on retractable supports and are able to cooperate with racks or chains rigidly connected to the uprights of the shelves, so as to allow the carriage to ascend between two shelves, and with counter-wheels. A runner is fixed substantially at a distal end of each of the supports and is position with respect to a counter-wheel mounted on the same support such that when the carriage climbs, the counter-wheel is in contact with a face of an upright and the runner is spaced apart from the upright, and, if the movable support weakens due to failure, the runner comes to bear on the upright, so as to block the downward advance of the movable support.

13 Claims, 9 Drawing Sheets

(56) References Cited

U.S. PATENT DOCUMENTS

| | | | | |
|---|---|---|---|---|
| 11,161,690 | B2 * | 11/2021 | Austrheim | B65G 1/0464 |
| 12,064,992 | B2 * | 8/2024 | Zhang | B60K 17/043 |
| 12,421,036 | B2 * | 9/2025 | Wu | B65G 1/0435 |
| 12,479,661 | B2 * | 11/2025 | Baulard | B65G 1/065 |
| 12,497,239 | B2 * | 12/2025 | Ning | B65G 1/065 |
| 12,559,316 | B2 * | 2/2026 | Dayrell | B65G 1/1373 |
| 2006/0182546 | A1 * | 8/2006 | Shinozuka | E04H 6/22 414/234 |
| 2020/0180863 | A1 * | 6/2020 | Moulin | B65G 1/0492 |
| 2022/0212867 | A1 * | 7/2022 | Wu | B65G 1/0492 |
| 2022/0402699 | A1 * | 12/2022 | Schauer | B65G 1/0435 |
| 2023/0211948 | A1 * | 7/2023 | Austrheim | B65G 1/0464 414/281 |
| 2024/0336438 | A1 * | 10/2024 | Chatain | B60K 17/30 |
| 2025/0313406 | A1 * | 10/2025 | Roels | B65G 1/0492 |

FOREIGN PATENT DOCUMENTS

| | | | |
|---|---|---|---|
| WO | 2017064410 | A1 | 4/2017 |
| WO | 2020156026 | A1 | 8/2020 |

* cited by examiner

ORDER PREPARATION OR BUFFER STORAGE SYSTEM

FIELD

The field of the invention is that of warehouse logistics and in particular the handling, the storage and the transportation of parts or products.

More specifically, the invention relates to an order preparation or buffer stock system.

The invention is notably applicable in the automation of the management of flows in a storage warehouse, for example in a warehouse for preparing orders of a logistical chain, or in the automation of a service for delivery of orders to a collection point, commonly referred to as "click and collect".

BACKGROUND

In the global logistics chain, the management of flows and the handling of products within a warehouse play a decisive role.

Traditionally, a preparer of orders moves around in the warehouse to collect each product of an order at its location on a shelf of a shelving unit.

It is found that such an organization means that the preparer makes long journeys in the course of a working day, which results in fatigue and loss of time when the path is not optimized.

Another drawback is that the preparer must have a perfect knowledge of how the warehouse is arranged so as not to waste time.

To limit the fatigue due to the movements, to improve the management of the picking, to reduce the order preparation time and the cost thereof, an organization of the warehouses in which the products are taken from the shelving units by robots then conveyed by these same robots to order preparation stations has been devised.

It has notably been proposed to implement self-guided vehicles which are both capable of rolling on the ground and of climbing along shelving units to go to take products stored in bins.

Thus, for example, from the document WO 2010/100513 A2 or from the document WO 2017/064410 A1, a robot is known that is equipped on the sides of its frame with retractable toothed wheels that can be deployed laterally. These toothed wheels are intended to mesh on vertical racks or chains fixed to uprights of the shelving units, to allow the robot to rise between two shelving units in order to arrive at the level of a bin to be taken. The robot is, moreover, provided with counter-wheels to guide the robot in its progress and prevent the robot from dropping.

One drawback with these known robot techniques is that, when an arm bearing one of the toothed wheels breaks and the robot tends to sag, the counter-wheel or -wheels keeping it from dropping exert(s) a torque on the uprights, which deforms the latter. The deformed uprights must then be replaced, which requires an intensive intervention on the shelving units and can result in the stoppage of the order preparation system for a long period.

SUMMARY

The objective of the invention is therefore notably to mitigate the drawbacks of the state-of-the-art cited above.

More specifically, the objective of the invention is to provide an order preparation system that implements robots capable of climbing on shelving units, which does not necessitate being shut down for a prolonged period in the event of mechanical failure of the climbing system of a robot.

Another objective of the invention is to provide an order preparation technique which is reliable and simple to implement.

One objective of the invention is also to provide an order preparation technique which is inexpensive.

These objectives, and others which will become apparent hereinbelow, are achieved using a system, such as an order preparation system or a buffer stock system, comprising:

a first shelving unit and a second shelving unit, said first shelving unit and said second shelving unit delimiting an aisle;

a first pair of uprights secured to said first shelving unit and a second pair of uprights secured to said second shelving unit, the uprights of said first pair of uprights being each mounted facing an upright of said second pair of uprights;

at least one automatic guided vehicle intended to take objects from at least one of said shelving units, said vehicle comprising motorized climbing means capable of cooperating with said uprights so as to allow said vehicle to rise along said uprights, said climbing means comprising four toothed wheels each intended to cooperate with racks or chains secured to said uprights of said first pair and of said second pair of uprights, each of the toothed wheels being mounted on a support that is movable with respect to the frame of said vehicle between two positions:

a deployed position, in which at least a part of said toothed wheel mounted on said support protrudes out from said frame;

a retracted position, in which the toothed wheel mounted on said support is housed in or on top of said frame, said vehicle comprising means for driving said toothed wheels in rotation and said movable supports comprising means for securing with said uprights comprising a counter-wheel mounted on each of said supports, each of said counter-wheels being intended to roll on a face of one of said uprights opposite the face of said uprights to which said rack or said chain is secured.

According to the invention, a runner is fixed substantially at a distal end of each of said supports, said runners extending substantially vertically, said runner and said counter-wheel of a same movable support being positioned with respect to one another on said support such that, when said driving means mesh the toothed wheel mounted on this same movable support with the rack or the chain of one of said uprights, said counter-wheel is in contact with said opposite face of this upright and said runner is separated from this upright and that, when said vehicle has climbed on said uprights and said toothed wheel can rotate freely following a failure of said driving means, resulting in a sagging of said movable support, said runner comes to bear on a portion of the face of said upright to which a rack (26) or a chain is secured so as to stop the downward advance of said movable support.

Thus, in an original manner, the invention proposes implementing runners shrewdly positioned with respect to the counter-wheels, in order to block the descent of the vehicle without deforming the uprights.

In a particular embodiment of the invention, said uprights of said first pair and of said second pair of uprights have an omega profile, or an angle-iron profile of which at least one flange has a folded-down edge, each of said runners is turned toward said shelving units when said vehicle is engaged in said aisle, and the portion of the face of said upright to which a rack or a chain is secured, and on which a runner can come to bear, is a portion of the face turned toward said aisle of a folded-down edge of an upright.

In variants of this particular embodiment of the invention, said uprights of said first pair and of said second pair of uprights can have a U-shaped profile and the portion of the face of said upright to which a rack or a chain is secured, and on which a runner can come to bear, can be a portion of a face of a flange of one of the uprights which extends at right angles to said aisle.

Preferably, said runners are mounted on said supports at a height greater than that of said counter-wheels.

According to a particular aspect of the invention, when said driving means mesh a toothed wheel mounted on a movable support with the rack or the chain of one of said uprights, the distance projected on the horizontal between the outer surface of the runner fixed onto the same movable support and the axis of the counter-wheel mounted on the same movable support is greater than the aggregate of the value of the radius of the counter-wheel and of the thickness of a flange of this upright.

Thus, the runner does not rub on the upright when the vehicle is operating appropriately.

Advantageously, said runners comprise a block made of elastomer material, preferably made of polyurethane.

According to an advantageous aspect of the invention, said block is housed in a ring.

In a particular embodiment of the invention, the width or the length of said vehicle is less than the spacing between the uprights of said first pair of uprights or of said second pair of uprights, and said movable support is configured such that, in said deployed position, at least a part of each of said toothed wheels also protrudes out from an edge of said frame facing said aisle.

Thus, since the toothed wheels can be deployed both on the sides but also on the front or on the rear of the vehicle, the latter can both climb on the shelving units, but also travel under the shelving units, which makes it possible to optimize the path of the vehicles, and in particular reduce the distance travelled on the ground by the vehicles and avoid the risks of travel conflicts between two vehicles by significantly multiplying the possibilities of alternative routes, and ultimately greatly increase the order preparation flow in a warehouse or the number of goods that can be stored, or removed from storage, per hour in a buffer stock installation. Furthermore, by virtue of the invention, two vehicles can climb between the first shelving unit and the second shelving unit in contiguous vertical chimneys, each delimited by a first pair of uprights secured to the first shelving unit and a second pair of uprights secured to the second shelving unit, facing one another, which share a common upright for each shelving unit.

In a particular embodiment of the invention, when said vehicle is engaged in said aisle, the axes of said toothed wheels are parallel to the axis of said aisle. According to a particular embodiment of the invention, said movable supports are mounted to pivot and/or slide with respect to said frame.

In a particular embodiment of the invention, said movable supports are mounted substantially at the four corners of the frame of said vehicle.

According to a particular aspect of the invention, said driving means comprise four independent motors each intended to drive one of said toothed wheels.

In a particular embodiment of the invention, said racks secured to the uprights are formed of a single piece with these uprights, for example by a drawing method.

In an advantageous embodiment of the invention, each of the racks or of the chains secured to one of said uprights extends under this upright substantially to the ground and a guiding element having a rolling surface for one of said counter-wheels extends vertically along the lower portion of said rack or of said chain substantially from the ground to the height of the base of the upright. The vehicle is thus guided in its climb/descent as soon as it rises from the ground.

According to a particular aspect of the invention, said automatic guided vehicle is able to roll on the ground.

In a particular embodiment of the invention, said runners are turned toward the outside of said vehicle.

The runners can notably be turned at right angles to the sides of the vehicle or to the front or the rear of the vehicle.

According to another particular aspect of the invention, in said deployed position, at least a part of said toothed wheel mounted on said support protrudes laterally out from said vehicle.

BRIEF DESCRIPTION OF THE FIGURES

Other features and advantages of the invention will become more clearly apparent on reading the following description of an embodiment of the invention, given as a simple illustrative and nonlimiting example, and the attached drawings in which.

DETAILED DESCRIPTION

Figure 1:
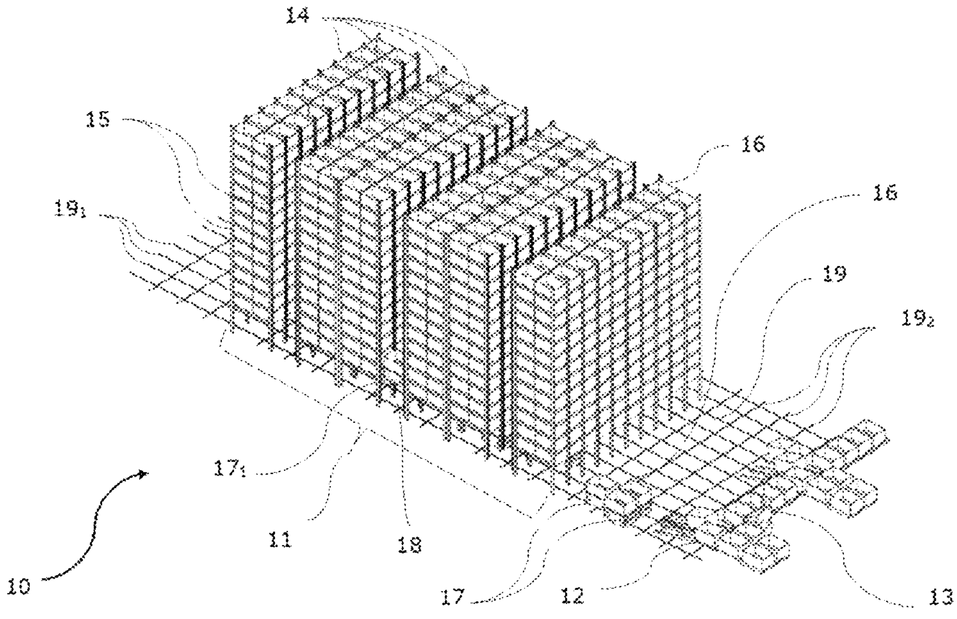
FIG. 1 is a schematic view, in perspective, of a warehouse equipped with an exemplary embodiment of an order preparation system according to the invention.

FIG. 1 illustrates a warehouse 10 intended to store products for the shipping thereof. This warehouse is divided up between a storage area 11 and an order preparation zone in which there are order preparation stations 12 where operators 13 prepare packages with the products of an order.

The storage area 11 is organized into shelving units 14 comprising shelves on several levels supported by uprights 15, on which bins 16 are interposed containing the products or articles stored.

A fleet of automatic guided vehicles 17 ensures the transportation of the bins 16 between the storage area 11 and the order preparation stations 12.

When a robot 17 receives location information on a bin 16 containing one or more articles to be fetched to complete an order processed by an operator 13, the robot 17 rolls on the ground to the foot of the shelving unit 14 where the bin 16 is stowed and is positioned in the aisle 18 between this shelving unit 14 and the shelving unit which faces it.

During this movement, the robot 17 follows the direction of bands drawn on the ground organized according to a grid 19 scheme. As can be seen in FIG. 1, a robot 17 can thus move in the direction of the longitudinal bands 191, or lateral bands 192 at right angles to the bands 191, and can travel under the shelving units 14.

This robot 17 then climbs, in the manner of the robot 171 represented in FIG. 1, by bearing on two shelving units to the level of the shelf where the bin 16 is stowed and extracts it from the shelving unit. It then redescends between the two shelving units, and, once on the ground, transports the bin 16 to the order preparation station 12 by following the grid 19. The operator 13 now only has to take the quantity of articles ordered and package them.

Figure 2:
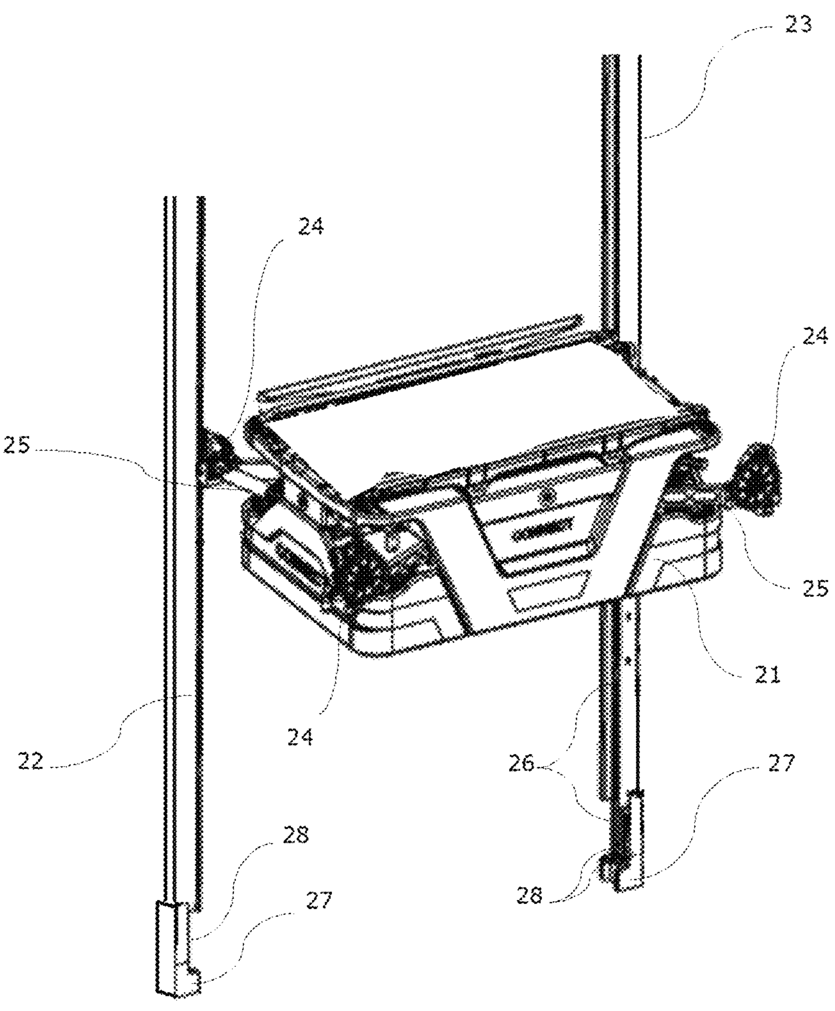
FIG. 2 is a perspective view of a motorized automatic guided vehicle of the system presented with reference to FIG. 1 climbing between two shelving units of the warehouse.

FIG. 2 shows a detail view of a robot 12 rising between two shelving units by bearing on two omega-profile uprights of each shelving unit. In FIG. 2, only the uprights 22 and 23 that are the most set back have been represented, for the purposes of legibility.

To climb between the shelving units, the robot 21 is equipped at the corners of its frame with four toothed wheels 24 mounted on retractable motorized arms 25, that it has deployed by making them slide substantially diagonally out from the frame until the toothed wheels 24 can enter into contact and engage with racks 26 fixed to the uprights 22 and 23.

It should be noted that each of the racks 26 extends under the upright 22, 23 to which it is fixed substantially down to the ground. Guiding supports 27 jacket the lower portion of the racks extending from the ground to the base of the uprights 22, 23. The edges 28 turned toward the aisle of these supports 27 offer an initial rolling surface for the counter-wheels 32 with which each of the arms 25 of the robot is equipped, against which they come to bear, which makes it possible to appropriately position the counter-wheels in the first centimeters of climb from the ground, for them to be able to then cooperate effectively with the uprights.

Figure 3:
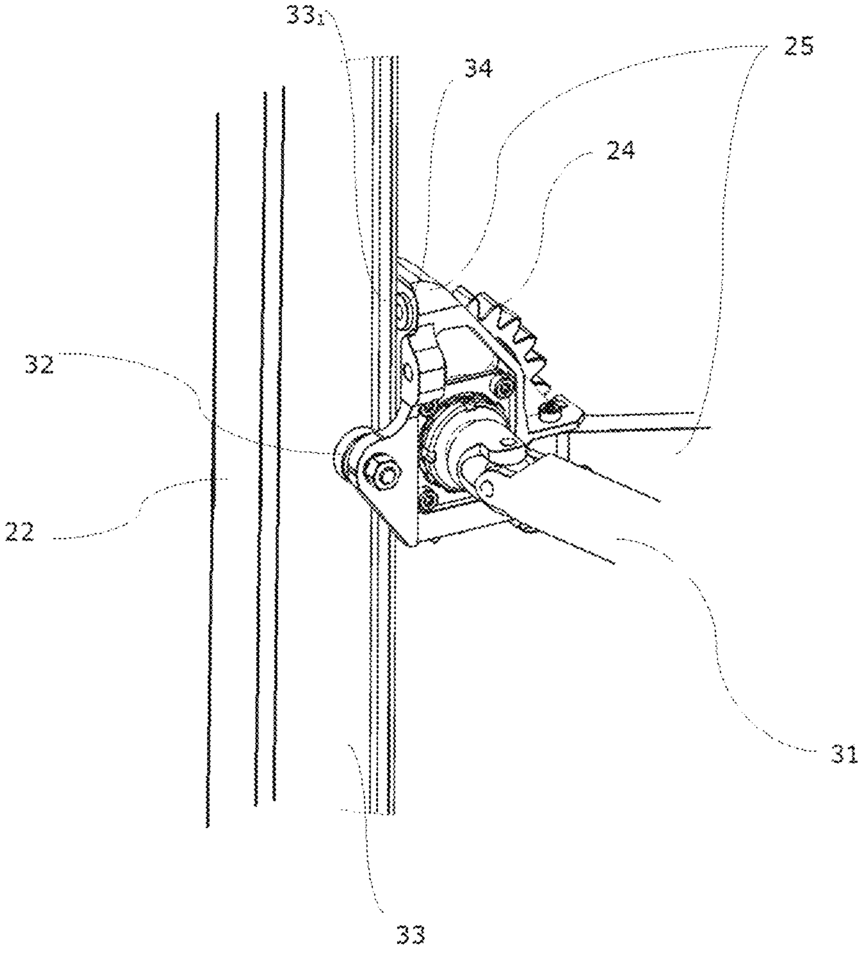
FIG. 3 is a detail view of the end zone of an arm of the vehicle presented with reference to FIG. 2.

As can be seen in FIG. 3, which is a detail view of the end of one of the arms 25, the toothed wheel 24 mounted on this arm 25 is driven in rotation by a motor shaft 31 linked to the toothed wheel 24 via a universal joint.

A counter-wheel 32 making it possible to take up a part of the weight of the robot and control the trim of the robot to prevent it from toppling is fixed to the bottom end of the arm 25. This counter-wheel 32 bears and rolls on a folded-down edge 331 of a flange 33 of the upright 22, on its face turned in the direction opposite to the aisle separating the shelving units.

Figure 4:
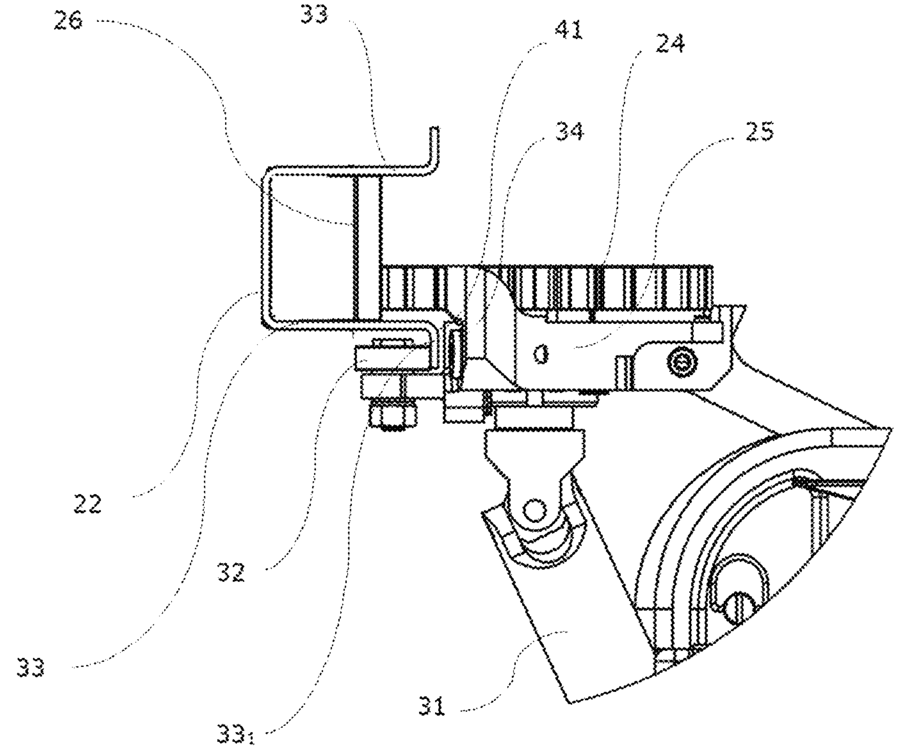
FIG. 4 is a top view of the end zone of an arm of the vehicle presented with reference to FIG. 2.

A runner 34 is moreover fixed onto the top part of the arm 25, at the distal end thereof, facing the face 41 of the edge 331 turned toward the aisle, at a predefined distance from the counter-wheel 32. As can be seen in FIG. 4 in a top view of the end zone of the arm 25, the runner 34 does not touch the folded-down edge 331 when the robot 21 climbs/descends.

In this particular embodiment of the invention, the runners 34 are formed from a block made of polyurethane housed inside a ring which makes it possible to limit the deformation of the block.

Figure 5:
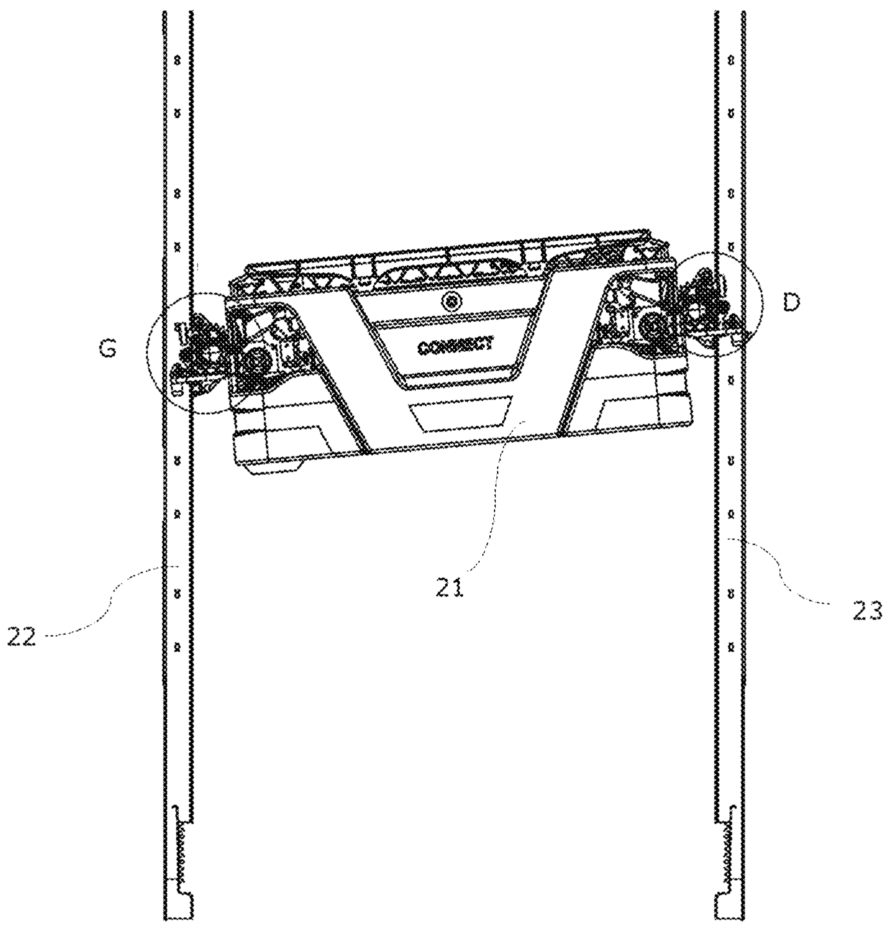
FIG. 5 is a side view of the motorized vehicle presented with reference to FIG. 2 stopped following the breaking of a driveshaft of one of the toothed wheels of the vehicle situated on the left side thereof.

The vehicle 21 in FIG. 5 has been represented after the breaking of a drive shaft 31 of a toothed wheel 24 situated on the left side and at the front of the vehicle 21. Since the front left toothed wheel 24 is then free to rotate freely, the robot 21 has sagged on the left side and is blocked between the uprights 22 and 23, in the position represented in FIG. 5.

Figure 6:
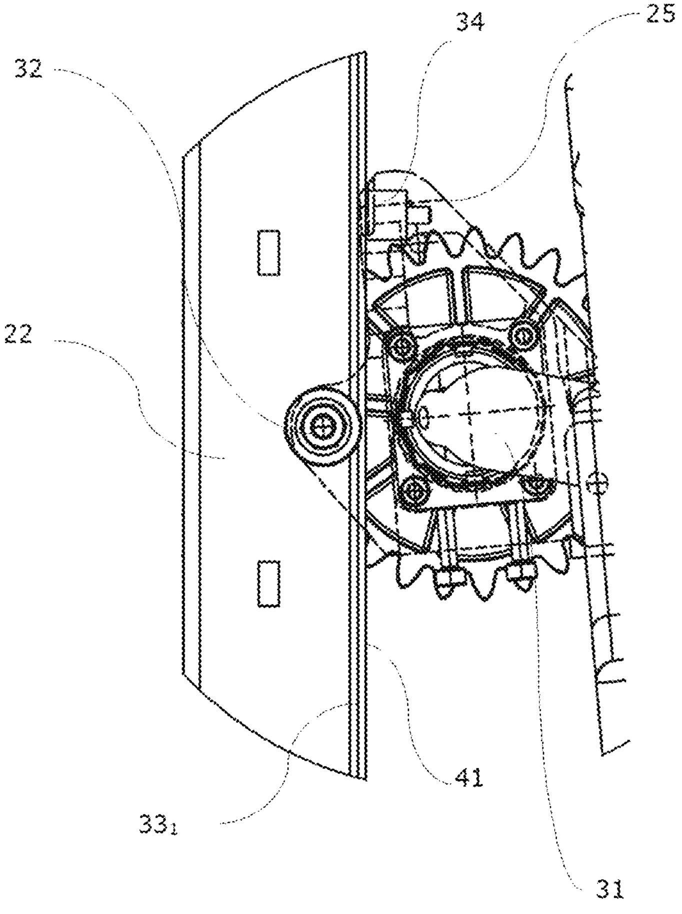
FIG. 6 is a side view of the end zone G of a left arm of the vehicle presented with reference to FIG. 5, which is secured to the damaged drive shaft.
Figure 8:
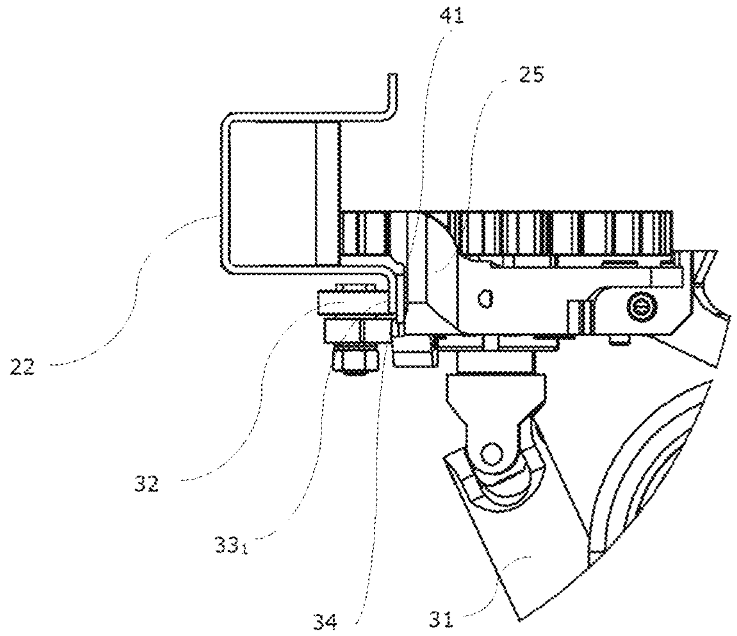
FIG. 8 is a top view of the end zone of the left arm of the vehicle presented with reference to FIG. 5 secured to the damaged drive shaft.

Since, in this blockage position, the front left arm 25 of the robot 21 extends inclined downward, the runner 34 has come to bear on the face turned toward the aisle 41 of the folded-down edge 331 of a flange of the upright 22 and, by virtue of the friction of the runner 34 on the edge 331, the downward progress of the arm 25 has been stopped, as can be seen in FIGS. 6 and 8, which are, respectively, detail side and top views of the zone of the front left arm.

Figure 7:
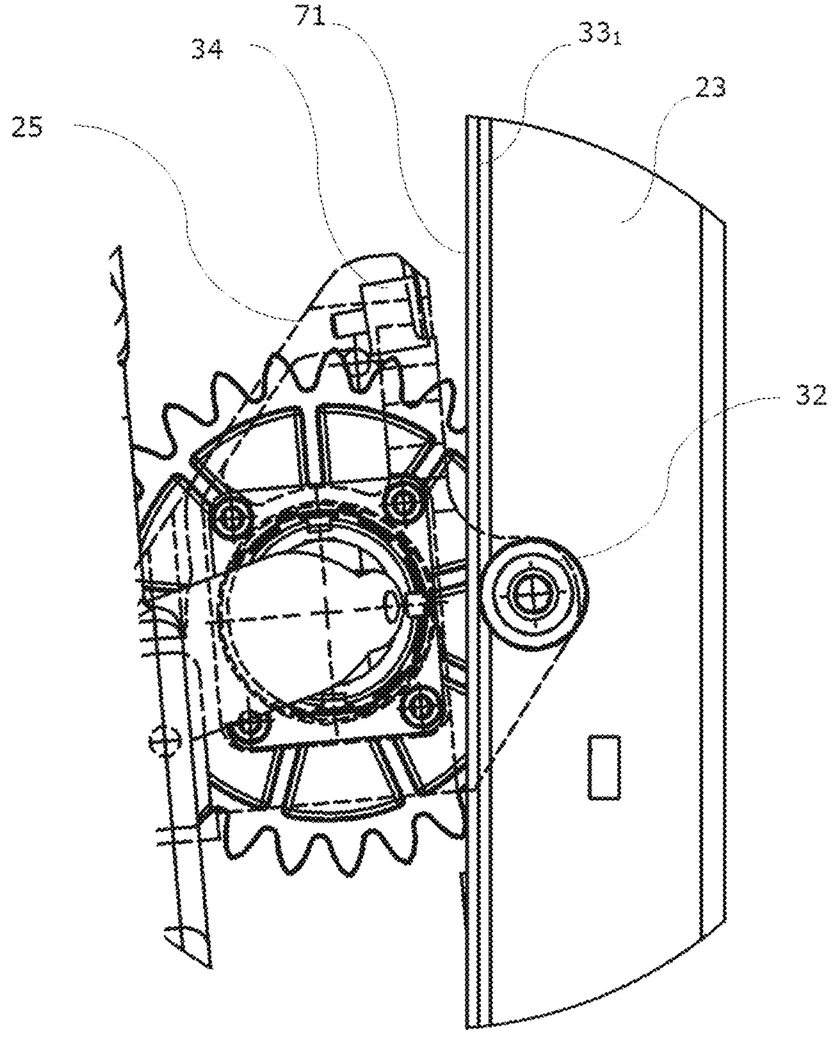
FIG. 7 is a side view of the end zone D of an arm situated on the right side of the vehicle presented with reference to FIG. 5.
Figure 9:
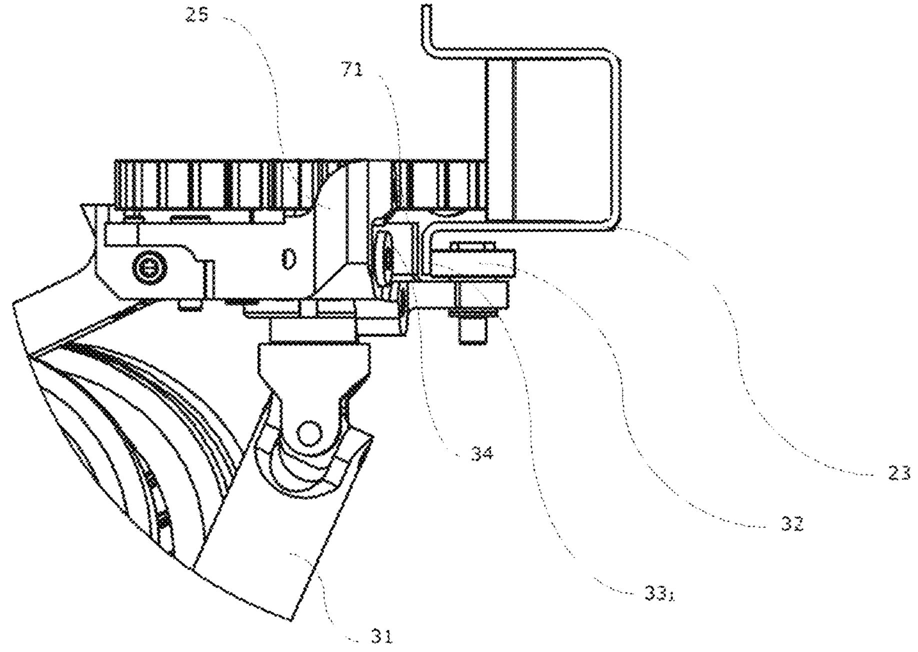
FIG. 9 is a top view of the end zone of a right arm of the vehicle presented with reference to FIG. 5.

On the front right side of the robot, the runner 34 is, for its part, still at a distance from the face 71 of the edge 331 of the flange 33 of the upright 23 (see FIGS. 7 and 9 which are, respectively, detail side and top views of the zone of the front right arm).

It should be noted that, by virtue of the implementation of the runners 34, the counter-wheels 32 do not exert shear force on the edges of the flanges of the upright 22 or of the upright 23, which makes it possible to avoid a deformation thereof and therefore having to intervene to replace these uprights in case of breakage of a drive arm of a toothed wheel of the vehicle.

The invention claimed is:

1. A system comprising:

a first shelving unit and a second shelving unit, said first shelving unit and said second shelving unit delimiting an aisle;

a first pair of uprights secured to said first shelving unit and a second pair of uprights secured to said second shelving unit, the uprights of said first pair of uprights being each mounted facing an upright of said second pair of uprights;

at least one automatic guided vehicle intended to take objects from at least one of said shelving units, said vehicle comprising motorized climbing means capable of cooperating with said uprights so as to allow said vehicle to rise along said uprights, said climbing means comprising four toothed wheels each intended to cooperate with racks or chains secured to said uprights of said first pair and of said second pair of uprights, each of the toothed wheels being mounted on a support that is movable with respect to the frame of said vehicle between two positions:

a deployed position, in which at least a part of said toothed wheel mounted on said support protrudes out from said frame;

a retracted position, in which the toothed wheel mounted on said support is housed in or on top of said frame, said vehicle comprising means for driving said toothed wheels in rotation, means for securing with said uprights comprising a counter-wheel mounted on each support, each counter-wheel being intended to roll on a face of one of said uprights opposite the face of said uprights to which said rack or said chain is secured, wherein:

a runner is fixed substantially at a distal end of each support, said runners extending substantially vertically, said runner and said counter-wheel are positioned with respect to one another on said support such that, when said driving means mesh the toothed wheel mounted on said support with the rack or the chain of one of said uprights, said counter-wheel is in contact with said opposite face of this upright and said runner is separated from this upright and that, when said vehicle has climbed on said uprights and said toothed wheel can rotate freely following a failure of said driving means, leading to a sagging of said support, said runner comes to bear on a portion of the face of said upright to which a rack or a chain is secured so as to stop the downward advance of said support.

2. The system as claimed in claim 1, wherein said runners are mounted on said support at a height greater than that of said counter-wheels.

3. The system as claimed in claim 1, wherein when said driving means mesh a toothed wheel mounted on said support with the rack or the chain of one of said uprights, the distance projected on the horizontal between the outer surface of the runner fixed onto said support and the axis of the counter-wheel mounted on said support is greater than the aggregate of the value of the radius of the counter-wheel and of the thickness of a flange of this upright.

4. The system as claimed in claim 1, wherein said runners comprise a block made of elastomer material.

5. The system as claimed in claim 4, wherein said block is housed in a ring.

6. The system as claimed in claim 1, wherein the width or the length of said vehicle is less than the spacing between the uprights of said first pair of uprights or of said second pair of uprights, and said support is configured such that, in said deployed position, at least a part of each of said toothed wheels also protrudes out from an edge of said frame facing said aisle.

7. The system as claimed in claim 6, wherein when said vehicle is engaged in said aisle, the axes of said toothed wheels are parallel to the axis of said aisle.

8. The system as claimed in claim 1, wherein each support mounted to pivot and/or slide with respect to said frame.

9. The system as claimed in claim 1, wherein each support mounted substantially at the four corners of the frame of said vehicle.

10. The system as claimed in claim 1, wherein said driving means comprise four independent motors each intended to drive one of said toothed wheels.

11. The system as claimed in claim 1, wherein each of the racks or of the chains secured to one of said uprights extends under said one of said uprights substantially to the ground, and a guiding element having a rolling surface for one of said counter-wheels extends vertically along the lower portion of said rack or of said chain, substantially from the ground to the height of the base of the upright.

12. The system as claimed in claim 1, wherein said runners are turned toward the outside of said vehicle.

13. The system as claimed in claim 1, wherein said uprights of said first pair and of said second pair of uprights have an omega, or angle-iron, profile, of which at least one flange has a folded-down edge, each of said runners is turned toward an upright of said shelving units when said vehicle is engaged in said aisle, and the portion of the face of said upright to which a rack or a chain is secured and on which a runner can come to bear is a portion of the face turned toward said of a folded-down edge of an upright.

* * * * *